March 9, 1937.    J. BALTON    2,073,440
ICE CREAM CONE
Filed Feb. 14, 1936

Inventor
JAMES BALTON
By Albert F. Dieterich
Attorney

Patented Mar. 9, 1937

2,073,440

UNITED STATES PATENT OFFICE 2,073,440

ICE CREAM CONE

James Balton, Baltimore, Md., assignor of one-fourth to Joseph Shapiro, Baltimore, Md., one-fourth to Isaac Shapiro, Chicago, Ill., one-fourth to Nathan Shapiro and one-fourth to Samuel Shapiro, both of Chelsea, Mass.

Application February 14, 1936, Serial No. 63,955

6 Claims. (Cl. 99—89)

My invention relates to certain new and useful improvements in ice cream cones and it especially has for its object to provide an ice cream cone of a simple construction which is especially adapted for the dispensing of hard ice cream blocks or slices (commonly called brick ice cream).

Further, it is an object to provide such a cone so constructed and proportioned that while the stems proper will nest they will be held out of contact by the wings or side pockets of the cone, the latter being so constructed that one will rest on top of another in such a way that the weight of the nested cones will be supported wholly by the wings or side pockets without the necessity of providing nesting rings on the conical stem.

Further, it is an object to provide ribs which serve the purpose of bracing or supporting the side pockets as brackets and also function as means to limit the swivelling of one cone in another.

Other objects will in part be obvious and in part generally pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawing, in which:

Figure 1:
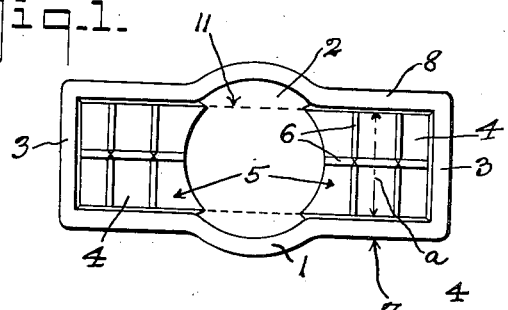
Figure 1 is a top plan view of the invention.

In the drawing, in which like numerals of reference indicate like parts in all of the figures, 1 represents the stem of the cone which is of conical form from the top of the cone to the tip of the stem and which is circular in cross section throughout and is provided with an internal chamber 2, the wall of the stem being of uniform thickness from bottom to top to ensure proper baking.

Figure 4:
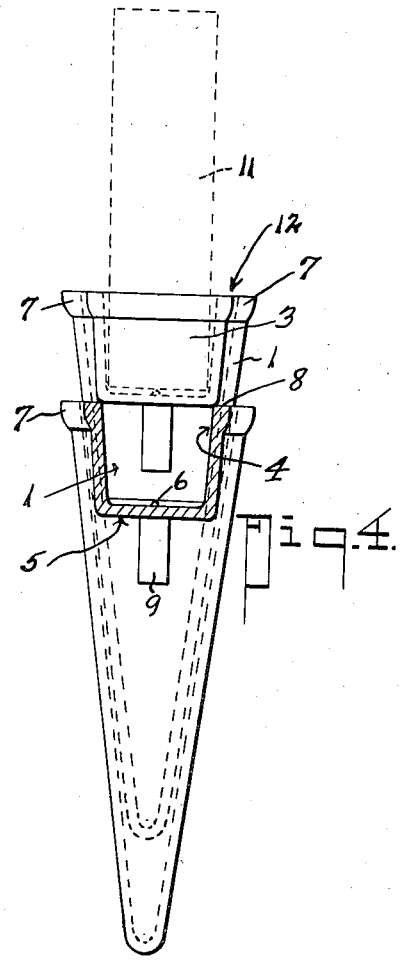
Figure 4 is a section on the line 4—4 of Figure 2.
Figure 3:
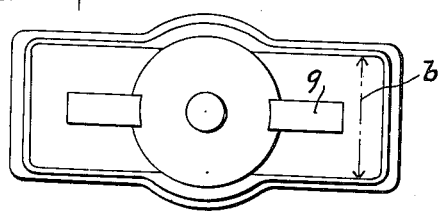
Figure 3 is an inverted plan view of the cone.

Disposed in transverse diametric alignment are two wings or pockets 3 at the upper end of the stem, which pockets are of rectangular form in plan view and have spaces 4 for the reception of the ice cream brick 11, see dotted lines Figure 4. The bottoms 5 of the pockets 3 are flat and in the same transverse plane and are preferably provided with cross ribs 6 on which the block of ice cream may rest.

The mouth of the cone, including the stem and pockets, is provided with the usual mouth rim or thickened portion 7 and the upper edges 5 of the stem 1 and pockets 3 lie in the same plane 8.

9 designates bracing ribs or brackets which join the stem 1 and the wings 3 and serve to support the wings against breaking off when the ice cream is inserted or when the cones are stacked together for shipping.

Figure 2:
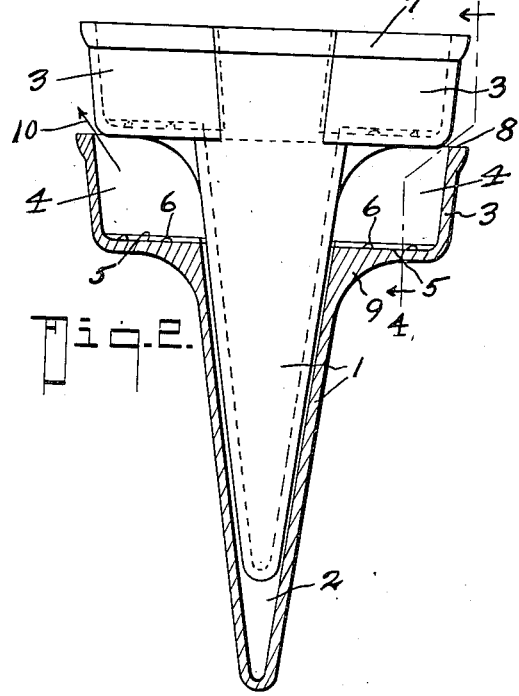
Figure 2 is a side elevation of one cone and a vertical longitudinal section of a second cone nested together.

As will be noted by reference to Figures 2 and 4, the area of the outer surface of the bottom 5 of the wings or pockets 3 is less than the area of the top of the pocket so that when the cones are nested the upper pocket 3 will rest on the sides of the lower pocket 3 with the bracing ribs 9 of one cone located within the pockets of the cone beneath. Furthermore, the walls of the pockets 3 are preferably slightly tapered downward so that when the cones are nested a space shown by the arrow 10 is provided for air circulation purposes. Furthermore, since the stems 1—1 do not rest on one another at the top, as is the case when nesting rings are used, a space is left around the stems at the top through which air can pass into the stems and pockets 3, thus ensuring ample air circulation to keep the cones in good condition during shipment or storage.

It will also be noted that when a brick of ice cream is located in the pockets there will be a distinct space of consideraable cross sectional area left between the brick and the adjacent walls of the stem 1 so that meltings of the ice cream of the brick will run down through this space and collect in the stem.

From the foregoing description, taken in connection with the accompanying drawing, it is thought the construction, uses and advantages of my invention will be clear to those skilled in the art. I desire further to say that not only do the bracing ribs 9 perform the dual function of bracing or supporting the pockets 3 and preventing swivelling of one cone in another, they also serve, when paper separators are used between layers of cones, to interlock with slots in the paper separators and hold the cones against any swivelling motion whatever. By holding the cones against any swivelling motion or against swivelling motion within a predetermined limit the cones are prevented from pieing up in the shipping boxes and thus damaging one another during shipment.

What I claim is:

1. An ice cream cone comprising a stem of conical form throughout its length, laterally and diametrically oppositely disposed pockets of rectangular form in plan view, and of a width less than the diameter of the stem at its top end, said pockets having flat bottoms, the bottoms of said pockets being of less width than the tops and said pockets being of greater outside width at the bottom than the inside width thereof at the top whereby when two cones are nested the upper pockets will rest on the mouth edge of the lower pockets to hold the nested stems against pressure engagement with one another, said pockets being constructed to receive and hold on edge a rectangular slice of ice cream, the stem at the sides of the slice being spaced therefrom to provide drip passages from the pockets into the stem.

2. An ice cream cone comprising a stem of conical form throughout its length, laterally and diametrically oppositely disposed pockets of rectangular form in plan view and of a width less than the diameter of the stem at its top end, said pockets having flat bottoms lying in the same plane normal to the axis of the stem, the bottoms of said pockets being of less width than the tops and said pockets being of greater outside width at the bottom than the inside width thereof at the top whereby when two cones are nested the upper pockets will rest on the mouth edge of the lower pockets to hold the nested stems against pressure engagement with that one, said pockets being constructed to receive and hold on edge a rectangular slice of ice cream, the stem at the sides of the slice being spaced therefrom to provide drip passages from the pockets into the stem.

3. An ice cream cone comprising a stem of conical form throughout its length, laterally and diametrically oppositely disposed pockets of rectangular form in plan view and of a width less than the diameter of the stem at its top end, said pockets having flat bottoms, the bottoms of said pockets being of less width than the tops and said pockets being of greater outside width at the bottom than the inside width thereof at the top whereby when two cones are nested the upper pockets will rest on the mouth edge of the lower pockets to hold the nested stems against pressure engagement with one another, and bracing ribs connecting the outside bottoms of the pockets with the outside of the stem, the brackets of one cone lying in the pockets of the next cone beneath when the cones are nested and serving also to limit swivelling of one cone in another, said pockets being constructed to receive and hold on edge a rectangular slice of ice cream, the stem at the sides of the slice being spaced therefrom to provide drip passages from the pockets into the stem.

4. An ice cream cone comprising a stem of conical form throughout its length, laterally and diametrically oppositely disposed pockets of rectangular form in plan view and of a width less than the diameter of the stem at its top end, said pockets having flat bottoms, the bottoms of said pockets being of less width than the tops and said pockets being of greater outside width at the bottom than the inside width thereof at the top whereby when two cones are nested the upper pockets will rest on the mouth edge of the lower pockets to hold the nested stems against pressure engagement with one another, the pockets and stem being open at the top to receive a rectangular brick of ice cream set on edge in said pockets and held thereby out of engagement with the stem, said pockets being constructed to receive and hold on edge a rectangular slice of ice cream, the stem at the sides of the slice being spaced therefrom to provide drip passages from the pockets into the stem.

5. An ice cream cone comprising a conical stem, the walls of which are of uniform thickness from top to bottom, pockets projecting laterally from said stem in diametrically opposite relation, each of said pockets being located at the top of the stem and having communication with the interior of the stem, the width of said pockets being substantially less than the diameter of the stem where they are attached, the pockets being so formed that when two cones are nested the upper cone will be supported by the mouth edge of the pockets of the lower cone, said pockets being constructed to receive and hold on edge a rectangular slice of ice cream, the stem at the sides of the slice being spaced therefrom to provide drip passages from the pockets into the stem.

6. An ice cream cone comprising a conical stem, the walls of which are of uniform thickness from top to bottom, pockets projecting laterally from said stem in diametrically opposite relation, each of said pockets being located at the top of the stem and having communication with the interior of the stem, the width of said pockets being less than the diameter of the stem where they are attached, the pockets being so formed that when two cones are nested the upper cone will be supported by the mouth edge of the pockets of the lower cone, the bottoms of said pockets lying in the same plane and being provided with raised ribs, said pockets being constructed to receive and hold on edge a rectangular slice of ice cream, the stem at the sides of the slice being spaced therefrom to provide drip passages from the pockets into the stem.

JAMES BALTON.